United States Patent

Gordy

[11] Patent Number: 5,188,707
[45] Date of Patent: Feb. 23, 1993

[54] PROCESS FOR CHEMICALLY HARDENING WOOD

[76] Inventor: John Gordy, 10720 Dennis Crescent, Richmond, B.C., Canada, V7A 3S1

[21] Appl. No.: 818,429

[22] Filed: Dec. 26, 1991

Related U.S. Application Data

[63] Continuation of Ser. No. 512,514, Apr. 19, 1990, abandoned, which is a continuation of Ser. No. 136,947, Dec. 23, 1987, abandoned.

[51] Int. Cl.$^5$ ............................................. D21J 1/12
[52] U.S. Cl. ........................................ 162/11; 162/13; 162/72; 162/77; 204/79; 204/132; 264/83; 264/343
[58] Field of Search ................ 162/11, 13, 27, 52, 162/72, 77, 26, 76, 63; 264/343, 83; 204/79, 132

[56] References Cited

U.S. PATENT DOCUMENTS

| | | | |
|---|---|---|---|
| 1,123,166 | 12/1914 | Burton | 204/132 |
| 2,037,001 | 4/1936 | Aronovsky | 162/77 |
| 3,699,202 | 10/1972 | Verbestel | 264/83 |
| 4,594,130 | 6/1986 | Chang et al. | 162/77 |
| 4,622,100 | 11/1986 | Godsay et al. | 162/72 |
| 4,923,656 | 5/1990 | Held | 264/83 |

OTHER PUBLICATIONS

Wise et al "The Effect of Ethanolamine on Woody Tissue" *Analytical Edition*, Jan. 15, 1939.

*Primary Examiner*—Steve Alvo
*Attorney, Agent, or Firm*—Longacre & White

[57] ABSTRACT

A method of hardening wood using a pulping agent for the chemical separation of lignin from cellulose in the wood without damage to either component. The pulping agent comprises the reaction product of (a) a compound produced by electrolytic oxidation of a predetermined amount of a loweralkanolamine in aqueous solution and neutralized with a strong mineral acid, with (b) the loweralkanolamine used in excess relative to the predetermined amount of loweralkanolamine subjected to the electrolytic oxidation. Also disclosed are processes utilizing such a pulping agent for chemically debarking whole logs as well as for converting soft wood into hard wood.

8 Claims, No Drawings

PROCESS FOR CHEMICALLY HARDENING WOOD

This is a continuation of Ser. No. 512,514, filed Apr. 19, 1990, which is a continuation of Ser. No. 136,947, filed Dec. 23, 1987, both now abandoned.

The present invention relates to a process for the treatment of soft wood to produce hard wood, and to a treatment solution therefor.

Wood is composed of two main constituents:
1. cellulose in the form of fibers; and
2. lignin which acts as an adhesive or resin to bind the cellulose fibers together.

The mechanical strength of wood is derived from its unique structure. FIBERGLAS (trade mark) obtains its mechanical properties from a combination of glass fibers and a bonding resin. The glass fibers provide tensile strength and elasticity, and the resin binds the fibers together in a solid form. The structure of wood is similar; the cellulose fibers are linear chains of carbohydrates bonded together with a phenolic type of resin, the lignin.

Cellulose fibers derived from wood have been a major source of a very important industrial chemical called "chemical cellulose". Chemical cellulose is used to produce a wide variety of commercial products, e.g., cardboard, newsprint, writing paper, plastics, explosives, etc.

The production of hard wood evolved from a series of investigations carried out into the nature of cellulose fibers and lignin. These investigations were pursued because of the difficulties associated with the industrial production of sulfite and kraft chemical celluloses, normally termed "pulps".

Both the sulfite and kraft processes use harsh and polluting chemicals. The use of harsh chemicals produces low yields and damaged cellulose fibers. The resin, or lignin, a potentially valuable chemical, is completely destroyed. The only industrial use for the lignin residues utilized today is for the production of steam.

Applicant's extensive studies on the chemical structure of cellulose and lignin and the toxic nature of both the kraft and sulfite processes led to the development of a pulping process utilizing a unique pulping agent, enabling the chemical separation of lignin from cellulose in wood without damage to either component.

Accordingly, it is an object of the present invention to provide a pulping agent and a process utilizing same, enabling the chemical separation of lignin from cellulose in wood without damage to either component, and thus the production of high yields of undamaged chemical cellulose and undamaged lignin.

It is a further object of the invention to provide various processes utilizing such a pulping agent, for example, for the chemical debarking of whole logs or the chemical hardening of soft wood by pressing to produce a very dense hard wood material.

According to one aspect of the invention, there is thus provided a pulping agent for the chemical separation of lignin from cellulose in wood without damage to either component, which pulping agent comprises the reaction product of (a) a compound produced by electrolytic oxidation of a predetermined amount of a loweralkanolamine in aqueous solution and neutralized with a strong mineral acid, with (b) the loweralkanolamine used in excess relative to the predetermined amount of loweralkanolamine subjected to the electrolytic oxidation.

The above pulping agent is prepared, in accordance with the invention, by first dissolving in water a predetermined amount of a loweralkanolamine such as monoethanolamine to form an aqueous solution thereof, then adding an aqueous solution of a strong mineral acid such as sulfuric acid to the aqueous solution of loweralkanolamine to neutrality (i.e. pH 7) followed by an excess of the loweralkanolamine. A pair of electrodes are immersed into the resulting solution to form an electrolytic cell and DC electric current is passed through the cell between the electrodes thereof for a period of time sufficient to allow the loweralkanolamine to undergo anodic oxidation, the resulting oxidation product reacting with the excess loweralkanolamine present in the cell to produce the desired pulping agent.

When using monoethanolamine as an example of suitable loweralkanolamine, the following reactions are believed to take place:

1. Dissolution of the monoethanolamine in water:

$$HO-CH_2-CH_2-NH_2 + H_2O \rightarrow HO-CH_2-CH_2-NH_3^{\oplus} + OH^{\ominus}$$

2. Addition of a strong mineral acid (e.g. $H_2SO_4$) to the monoethanolamine-water solution to neutrality:

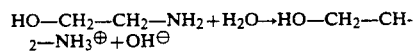

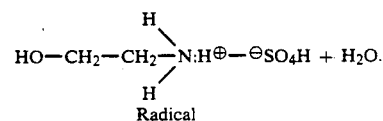
Radical

The above radical conducts electric current and allows the cell to operate at high efficiencies. Normal water solutions of monoethanolamine are poor conductors of electric current.

3. Electrolytic reactions when DC electric current is passed through the cell:

i. Cathode: hydrogen gas is evolved at the cathode:

$$2H^{\ominus} + 2e^{\oplus} + \text{Electrical Energy} \rightarrow H_2 \text{ (gas)}$$

ii. Anode: the monoethanolamine undergoes oxidation at the anode to produce species believed to be:

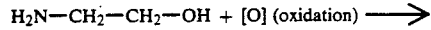

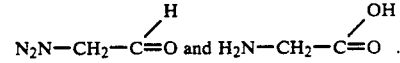

The above compounds react with the excess monoethanolamine which is preferably present in a weight ratio of about 5 times the original amount of monoethanolamine, to produce a polymer which is distilled from the electrolytic solution; this polymer is believed to be of the following type:

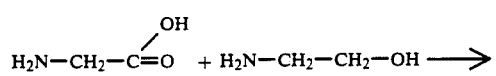

-continued

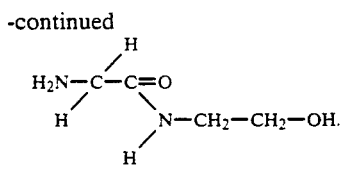

The pulping agent prepared as above is especially suited for the vapor phase pressure treatment of whole logs of various wood species, including deciduous (short-fibered) species such as alder, aspen, cottonwood, poplar, etc., and evergreen species such as hemlock, spruce, cedar, pine, etc.

It has been found quite surprisingly that when whole unbarked logs are treated with a pulping agent as defined above in vapor phase and under pressure, all species of logs are chemically debarked, the logs are pulped and the cell structure of the wood is altered, enabling the wood to be densified by subsequent pressing.

Even though the logs are treated in the vapor phase, the chemical vapors remove water and some wood components, such as lignin and wood sugars, and these condense in the liquid phase.

These very unique chemical reactions alter the chemical nature of both the bark and the wood. The resulting chemical action destroys the bark-to-sapwood bonds so that the bark literally falls off the log or the log may be peeled like a banana, leaving a clean, debarked log.

This is a significant advance in wood technology as pure chemical bark and whole peeled logs may be readily obtained. The chemically altered bark may be manufactured into high-density fuel and strong, dense bark boards, similar to particle boards.

Accordingly, the present invention provides in another aspect thereof a process for the vapor phase pressure treatment of whole unbarked logs, which comprises treating the logs with a pulping agent as defined hereinabove in vapor phase, under heat and pressure conditions and for a period of time sufficient to allow the vapors of pulping agent to permeate the logs and cause chemical debarking thereof.

Preferably, the vapor phase pressure treatment is carried in a pressure vessel at a pressure ranging from about 25 psi to about 50 psi, preferably 25-35 psi, the vessel being heated at a temperature sufficient to develop such a pressure, e.g. about 275°-350° F. The pressure is generally maintained for a period of about 10 to 15 minutes.

After the necessary treatment period has elapsed, the treated logs are removed from the pressure vessel and then moved to a debarking unit. Due to the chemical debarking which takes place during the vapor phase pressure treatment, the bark separates very easily, producing clean and undamaged debarked logs.

If a dense hard wood material is desired, the debarked logs while still hot are pressed in a hydraulic press and maintained in a compressed state until cool, the pressure applied varying according to density and thickness desired. Prior to being pressed, the debarked logs may optionally be cut into standard lumber sizes, depending on size of log and the lumber desired.

The vapor phase pressure treatment according to the invention is operative not only on green wood, but on kiln-dried wood as well. Thus, both vapor phase pressure treated green wood and vapor phase pressure treated dried wood can be hardened according to the invention.

The utilization of relatively low hydraulic pressures required to produce hard wood according to the invention confirms that the pulping agent utilized chemically reacts with the lignin and cellulose constituents of wood and profoundly alters the cellular structure of the wood. These chemical reactions make the manufacture of hard wood technically and economically feasible.

The present invention also provides, in a further aspect thereof, a pulping process for chemically separating lignin from cellulose in wood without damage to either component, which comprises treating wood with a pulping agent as defined hereinbefore in vapor phase under heat and pressure conditions and for a period of time sufficient to allow the vapors of pulping agent to permeate the wood and cause a lignin depolymerization reaction, whereby a complex component of depolymerized lignin is extracted and collected in the form of a liquid pulping extract.

The temperature and pressure conditions as well as the treatment period are essentially the same as those mentioned above for chemically debarking whole logs.

It has been found quite unexpectedly that the pulping extract which is derived from the above pulping process and contains a complex component of depolymerized lignin can be used as a cellular densification solution for wood, enabling soft wood to be converted into hard wood.

It has been observed that the pulping agent according to the invention reacts with the lignin in the wood and removes a bridging group within the polymer structure of lignin which causes the lignin to convert from a polymerized thermosetting resin to a type of monomeric thermoplastic form.

This type of monomeric thermoplastic form of lignin no longer binds the cellulose fibers together and therefore the cellulose fibers can be separated without damage into the form of pulp. In this state, the fibers are no longer stiff, as in the original wood, but rather take on a soft and pliable form, much like well-cooked spaghetti.

The cellular densification solution is thus essentially a solution of complex component of monomeric lignin. When such a solution is applied by brush or spray to raw wood, a very simple procedure, and the treated wood is then placed in a hydraulic press and heated, the solution vaporizes under the influence of heat and permeates the cell structure of the wood at a very rapid rate.

Two reactions take place. One end of the molecule of the hardening agent, having a reactive bond-cleaving structure, reacts with the bridging group in the wood lignin and converts the resin to a thermoplastic form. The other end of the molecule, which contains a reactive bridging group, bridges across the cellulose fibers and chains the fibers together.

The chain structure is extremely strong and chemically stable. The bridging group also displaces the water molecules which are chemically bonded in the cell structure of the wood and which hold the cellulose fibers together.

Water molecules are very rigid, while the newly-introduced bridging group molecules are both strong and flexible.

When hydraulic pressure is applied to treated wood, densification, displayed by a decrease in thickness, takes place. The amount of energy required to bring about this densification is quite low.

The altered thermoplastic resin, in heated form, shows very little mechanical resistance. The unbridged water also displays low mechanical resistance. The water molecules are no longer chemically bonded to the cell walls and therefore liquid water now flows from the structure of the wood as from a sponge.

Hard wood is manufactured by allowing the pressed wood to remain in the compressed state until cooked. The thermoplastic lignin, upon cooling, reverts to its thermosetting polymeric form, which strongly stabilizes the structure of the newly-densified wood. Additional strength is incorporated into the wood by bringing the cellulose fibers closer together, thus creating additional bonding between the cellulose fibers and the bridging chain as the bridging chain loops through the cellular structure.

This phenomenon theoretically explains the increase in hardness as the thickness of the original wood decreases.

The stabilization of the hard wood is advantageously accomplished by the use of a locking mould. On reaching the desired thickness in the hydraulic press, the mould is locked and removed from the press. The mould is allowed to cool for approximately one hour; the hard wood sample is then removed and the mould can be used for another wood sample. The use of locking moulds thus enables high volume production of hard wood.

It has also been found according to the invention, that the cellular densification solution when mixed with an acrylic polymer can be formulated into a wood adhesive having exceptional bonding properties.

Thus, for example, instead of taking a single piece of wood of three inches (3.0") thickness, treating the piece with the cellular densification solution and then heat pressing to a thickness of two inches (2.0"), it is possible to take two pieces of wood, 1.5" thickness a piece, apply a mixture of cellular densification solution and the acrylic polymer as an adhesive between the pieces only, and press the two pieces with the adhesive therebetween to produce the desired 2.0" thick hard wood. A fusion of the two pieces takes place producing a solid piece of hard wood.

Such a wood adhesive can also be used with advantage in the manufacture of plywood, as may be seen from the following non-limiting examples which further illustrate the invention.

EXAMPLE 1

Several sheets of plywood were manufactured from wood veneers utilizing a plywood adhesive formulated from the cellular densification solution.

Five layers of 1/10" veneer were placed in a hydraulic press and pressed into a plywood sheet.

The resulting plywood was surprisingly different from normal plywood. Instead of obtaining a sheet of plywood of ½" thickness, the resulting plywood sheet was only ¼" thick. The physical properties of this new form of plywood were also very different from ordinary plywood.

The surface of the new form of plywood was hard and smooth. Saw trimming of the sheet showed that all of the veneers had decreased in thickness to the same degree, to one-half of their original thickness. The plywood exhibited very high impact resistance. In a series of tests, the plywood was struck as hard as possible with a ball-peen hammer, to determine impact and puncture resistance. The surface of the plywood was barely dented.

Ordinary plywood treated in this same manner had deep indentation and in some cases the head of the ball-peen hammer completely punctured the ordinary plywood.

The impact and puncture resistance properties suggests the material can be utilized in the manufacture of shipping crates, boats, car bodies and armor plate, flooring, etc. It is also believed that the material can be suitable as a bearing material, to form "wooden" bearings.

EXAMPLE 2

A miniature "jeep" was constructed utilizing the plywood produced in Example 1, for body material and bearings. Wheel hubs were machined from several layers of the plywood and placed on axles made from aluminum tubing.

The jeep was taken to and driven over the top of a mountain range, over the roughest road in the area. The first ten miles consisted of washouts, boulders, logs and bush. The jeep was driven over this section to test impact against rocks, logs and bush.

The second ten-mile section was somewhat more passable and the jeep was driven over this section at higher speed to determine the resistance of the bearings to high-speed rotation and continuous impact of the wheels against boulders and potholes.

At the end of the run, the bearings were examined for generated heat and wear.

The bearings were found to be cool, indicating a low friction coefficient between the plywood and the aluminum axle. The bearings were next examined for wear.

The bearings were found to be tight, showing no signs of wear, yet rotated freely, indicating the new form of plywood had self-lubricating properties.

Examination of the body showed no punctures or cracks in the plywood. The material had withstood impact against rocks, logs and bush; it had resisted torsion and twisting, climbing over rocks and logs. In general, the material exhibited several excellent properties. Another experiment demonstrated even further the possibilities of this new form of plywood.

A 10-shot clip of 0.22 caliber Long Rifle cartridges was fired at very close range from a semiautomatic rifle into the material. The point of impact was examined.

It was discovered that the bullets had penetrated only about ⅛" into the material and had fused into a single ball of lead. The material thus exhibited the properties of a form of armor plate.

I claim:

1. A method of hardening wood, which comprises the steps of:
    a) applying onto a wood sample a cellular densification solution which contains a complex component of depolymerized lignin and is obtained by subjecting wood to a vapor phase pressure treatment with a pulping agent under heat and pressure conditions and for a period of time sufficient to allow vapors of said pulping agent to permeate the wood and cause a lignin depolymerization reaction, said pulping agent comprising the reaction product of a loweralkanolamine with a compound produced by electrolytic oxidation of the loweralkanolamine in an aqueous alkaline solution containing an acid addition salt of the loweralkanolamine;

b) heat pressing the wood sample obtained in step (a) to cause said solution to vaporize and permeate the wood; and c) allowing the pressed wood to cool while maintaining same in a compressed state until cooled.

2. A method as claimed in claim 1, wherein said lower-alkanolamine is monoethanolamine.

3. A method as claimed in claim 2, wherein said acid addition salt is an addition salt of the lower alkanolamine with sulfuric acid.

4. A method as claimed in claim 1, wherein said vapor phase pressure treatment is carried out at a pressure ranging from about 25 psi to about 50 psi.

5. A method as claimed in claim 4, wherein said vapor phase pressure treatment is carried out at a pressure ranging from about 275° to about 350° F.

6. A method as claimed in claim 1, wherein said cellular densification solution is applied by brush.

7. A method as claimed in claim 1, wherein said cellular densification solution is applied by spray.

8. A method as claimed in claim 1, wherein use is made of a locking mould for maintaining the pressed wood in a compressed state until cooled.

* * * * *